(12) United States Patent
Meriac et al.

(10) Patent No.: US 10,810,094 B2
(45) Date of Patent: Oct. 20, 2020

(54) METHODS AND APPARATUS FOR ANOMALY RESPONSE

(71) Applicant: Arm Limited, Cambridge (GB)

(72) Inventors: Milosch Meriac, Cambridge (GB); Xabier Iturbe, Cambridge (GB); Emre Ozer, Buckden (GB); Balaji Venu, Cambridge (GB); Shidhartha Das, Upper Cambourne (GB)

(73) Assignee: Arm Limited, Cambridge (GB)

( * ) Notice: Subject to any disclaimer, the term of this patent is extended or adjusted under 35 U.S.C. 154(b) by 195 days.

(21) Appl. No.: 16/014,154

(22) Filed: Jun. 21, 2018

(65) Prior Publication Data

US 2019/0391888 A1   Dec. 26, 2019

(51) Int. Cl.

| | |
|---|---|
| *G06F 11/00* | (2006.01) |
| *G06F 11/20* | (2006.01) |
| *G06F 11/16* | (2006.01) |
| *G06F 11/14* | (2006.01) |
| *G06F 11/30* | (2006.01) |
| *G06F 21/50* | (2013.01) |

(52) U.S. Cl.
CPC ........ *G06F 11/202* (2013.01); *G06F 11/1441* (2013.01); *G06F 11/1629* (2013.01); *G06F 11/3058* (2013.01); *G06F 21/50* (2013.01)

(58) Field of Classification Search
CPC .............. G06F 11/202; G06F 11/1441; G06F 11/1629; G06F 11/3058
See application file for complete search history.

(56) References Cited

U.S. PATENT DOCUMENTS

| 6,259,371 B1* | 7/2001 | Chang ..................... G06F 1/28 340/659 |
| 6,819,539 B1* | 11/2004 | Wright .................... G06F 1/30 361/90 |
| 10,418,808 B2* | 9/2019 | Bodette ............. G06F 11/3058 |
| 2013/0269030 A1* | 10/2013 | Milford .................. G06F 21/50 726/22 |
| 2017/0242760 A1* | 8/2017 | Tanaka ............... G06F 11/1654 |
| 2018/0097825 A1* | 4/2018 | Pavlas ................ G06F 11/3058 |

\* cited by examiner

*Primary Examiner* — Philip Guyton
(74) *Attorney, Agent, or Firm* — Nixon & Vanderhye P.C.

(57) ABSTRACT

Examples of the present disclosure relate to a method for anomaly response in a system on chip. The method comprises measuring a magnitude of a transient anomaly event in an operating condition of the system on chip. Based on the magnitude it is determined, for each of a plurality of components of the system on chip, an indication of susceptibility of that component to an anomaly event of the measured magnitude. Based on the determined indications of susceptibility for each of the plurality of components, an anomaly response action is determined. The method then comprises performing the anomaly response action.

18 Claims, 9 Drawing Sheets

US 10,810,094 B2

METHODS AND APPARATUS FOR ANOMALY RESPONSE

BACKGROUND

Technical Field

The present technique relates to the field of detection of, and response to, anomalies in operating conditions of a system on chip.

Technical Background

A system on chip (SoC) is an integrated circuit that includes components of a processing system. For example, a SoC may include one or more processors such as central processing units (CPUs) or graphics processing units (CPUs), input/output functionality, and memory.

The operation of a SoC may be affected by transient anomaly events in operating conditions of the SoC. Examples of such transient anomaly events include deviations from expected or nominal values of voltages on signal lines of the SoC, and also deviations from expected environmental conditions of the SoC.

Such anomaly events can affect the operation of a SoC in various ways. For example, some anomaly events may cause the SoC to produce unpredictable outputs. Anomaly events can also cause temporary or permanent damage to an SoC.

SUMMARY

At least some examples provide a method for anomaly response in a system on chip, the method comprising:
measuring a magnitude of a transient anomaly event in an operating condition of the system on chip;
based on the magnitude, determining, for each of a plurality of components of the system on chip, an indication of susceptibility of that component to an anomaly event of the measured magnitude;
based on the determined indications of susceptibility for each of the plurality of components, determining an anomaly response action; and
performing the anomaly response action.
Other examples provide an apparatus comprising:
an anomaly measuring unit to measure a magnitude of a transient anomaly event in an operating condition of a system on chip;
a susceptibility indication unit to, based on the magnitude, determine, for each of a plurality of components of the system on chip, an indication of susceptibility of that component to an anomaly event of the measured magnitude; and
an anomaly response unit to:
based on the determined indications for each of the plurality of components,
determining an anomaly response action; and
perform the anomaly response action.
Further aspects, features and advantages of the present technique will be apparent from the following description of examples, which is to be read in conjunction with the accompanying drawings.

DESCRIPTION OF EXAMPLES

Figure 1:
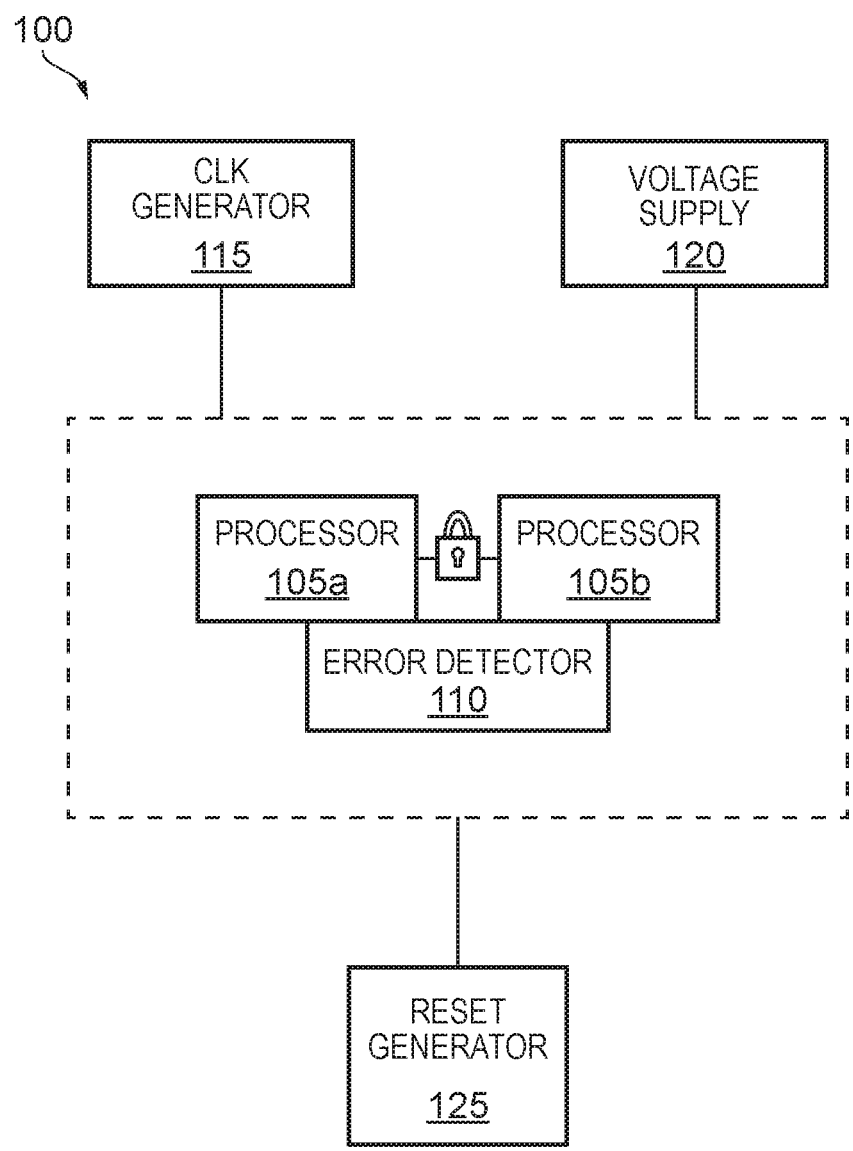
FIG. 1 shows schematically a lockstep processing system.

As noted above, the operation of a SoC can be affected by transient anomaly events. The present disclosure provides methods and apparatus for detecting and responding to such events.

In one example, a method for anomaly response in a SoC comprises measuring a magnitude of a transient anomaly event in an operating condition of the system on chip. The measuring may for example be performed by a dedicated measuring component of the SoC.

The anomaly may be a variation of the operating condition outside expected operating conditions of the SoC.

An example of such an operating condition is a voltage level or pulse duration of a signal on a signal line of the SoC, such as a power line, a clock line, an analog or digital signal line, a reset line, or an interrupt line. An anomaly in one of these operating conditions may be a spike or dip in the signal on the signal line, or variation in pulse duration caused by an early or late signal transition. In other examples, the operating condition is a noise level on the signal line and/or a level of specific unwanted frequencies on the signal line.

Other examples of such operating conditions include environmental conditions of the SoC, such as temperature, ionizing radiation flux, shock impulse, acceleration (for example peak acceleration), vibration intensity and/or electromagnetic flux.

The example method then comprises, based on the magnitude, determining, for each of a plurality of components of the SoC, an indication of susceptibility of that component to an anomaly event of the measured magnitude. For example, some components may be susceptible to the anomaly event whilst some are not. The susceptibility may depend on the magnitude such that a given component is not sensitive to anomalies below a given magnitude. Alternatively or additionally, the susceptibility may depend on whether or not a given component is active at the time of the anomaly. For example, inactive components may be less susceptible to anomalies than active components. In some examples, at least two components of the plurality of components comprise different sub-portions of the same processor core of the SoC. For example, the sub-portions may be stages of a processing pipeline, for example fetch, decode, execute, memory access and write back stages, or could be other components of a processor core, such as a branch predictor, memory management unit, or cache controller.

The method then comprises, based on the determined indications of susceptibility for each of the plurality of components, determining an anomaly response action. The anomaly response action is then performed.

The determination of the anomaly response action based on the individual susceptibility of each component of the SoC allows a more finely granular approach to determining the response action than would be possible with comparative methods in which individual susceptibilities of each component are not determined, and the response action is based only on an overall one-dimensional assessment of the susceptibility of the SoC as a whole. This provides improved system performance by reducing the likelihood of performing unnecessary response actions and allowing the response action to be adapted specifically to the particular components that are susceptible to the anomaly. For example, a susceptible component could be reset without resetting other components of the SoC, averting the need to reset the entire SoC and thereby improving system performance. In another example, if a given anomaly is of a magnitude that could in principle cause an error in the operation of a given component of the SoC, it can be determined whether that component was active at the time of the anomaly. If it is determined that the component was active, the specific component (or the whole SoC) may be reset. Conversely, if that component was inactive, it may be determined that the component was not in fact susceptible to the anomaly and thus no action may be taken. An unnecessary reset is thus averted, thereby improving system performance.

In such examples, determining the anomaly response action can comprise selecting the anomaly response action from a plurality of possible anomaly response actions, at least one of which permits continued forward progress of the SoC. Examples of actions that permit continued forward progress include the above-described decisions to not reset components of the SoC and, in some situations, to selectively reset particular components of the SoC in such a way that continued forward progress is possible. For example, one processing element may be reset while another processing element may continue processing to maintain forward progress. In another example, the response action may be to restore a previous set of architectural state captured at a time before the anomaly was detected, so that forward progress can continue from the previously captured state (in contrast to a full system reset where the executed program code may have to be restarted from the beginning). The provision of such actions improves system performance relative to systems in which no such actions are available: in such comparative systems, the available response actions (for example resetting the whole SoC) interrupt or prevent continued forward progress of the SoC.

In some examples, the method comprises determining a dependent component of the plurality of components, the dependent component being dependent on a given other component of the plurality of components. For example, the given other component may produce an output that is taken as an input by the dependent component. The determining of the susceptibility of the dependent component to the anomaly event is then additionally based on the susceptibility of the given other component to the anomaly event. For example, it may be determined that the given other component is susceptible to the anomaly event and the dependent component is not directly susceptible to the anomaly event. Despite this, as a consequence of the dependence of the dependent component on the given other component, the functioning of the dependent component may in fact be affected by the event such that the dependent component is indirectly susceptible. For example, as a consequence of the anomaly event, an incorrect output may be provided from the given other component to the dependent component. Tracking the dependency of the dependent component in this manner allows the response action to be determined taking into account indirect susceptibilities of components to the anomaly event as well as direct susceptibilities. For example, the dependent component and the given other component may both be reset. In some examples, it may be determined that the given other component, whilst in principle susceptible to the anomaly event, was inactive at the time of the anomaly event and as such the dependent component is not vulnerable to the anomaly event: in such an example, it may be that no response action is taken.

In examples, the determining of the indication for a given component of the plurality is based on comparing the measured magnitude with a range of the operating condition for the given component. For example, the voltage on a signal line may have a range of acceptable values. A voltage outside the acceptable range is then an anomaly event to which the given component may be susceptible. Similarly, the initial measuring of the magnitude of the anomaly event may comprise measuring a deviation of the operating condition outside an expected range, or measuring a deviation of the operating condition from a nominal value. A different range may be specified for at least two different components of the system on chip. For example, one component could tolerate greater drops in the nominal signal voltage than another component, or could tolerate larger deviations in pulse width than another component. By including in the SoC design programmable storage elements, or non-programmable or hardwired circuit elements, which define component-by-component thresholds of tolerance for at least two different components, this can enable a more precise determination of whether an individual component of the SoC is likely to be affected by a particular magnitude of anomaly.

In some examples, the aforementioned range is varied based on an operating state of the SoC. For example, when in certain operating states such as hibernation states or other states of reduced functionality, the components of the SoC may be less susceptible to particular anomaly events than when in a state of full functionality (e.g. greater deviation from nominal operating conditions may be tolerated). Similarly, the range may be varied based on environmental conditions of the SoC, for example temperature, for components for which the sensitivity to anomaly events depends on the environmental conditions. In another example, the range could be varied depending on whether the SoC (or an individual component of the SoC) is operating in a secure mode or more privileged mode. For example, a narrower range may be defined when in the secure mode or more privileged mode than when in a less secure mode or less privileged mode, so that the system is more sensitive to anomalies (which could potentially be a consequence of a malicious attack designed to break the security enforced by the secure or more privileged mode) when in the secure or more privileged mode.

As noted above, the susceptibility of a component of the SoC may depend on whether that component was active or inactive at the time of the anomaly event. More generally, in some examples the method comprises determining, for each component of the plurality, component usage information for a time of occurrence of the anomaly event. The determining of the indication for a given component of the plurality is then based on the component usage information for the given component. For example, when the component usage information for the given component of the plurality indicates an inactivity of the given component at the time of occurrence of the anomaly event, the indication for the given component may indicate a lack of susceptibility to the anomaly event. Alternatively or additionally, when the component usage information for the given component of the plurality indicates an inactivity of the given component at the time of occurrence of the anomaly event, and the indication for the given component indicates a susceptibility to the anomaly event, the anomaly response action may comprise resetting the given component and permitting continued forward operation of the system on chip. For example, the component may be reset in the background and re-initialised to an expected configuration. If during the resetting and re-initialisation process the component is operated upon by other components of the SoC, the processing may be stalled until the resetting and re-initialisation process is complete. Alternatively, an exception may be signalled and/or the SoC may be shut down or reset as a whole.

In some examples, the SoC is configured to perform a plurality of redundant workloads. Some types of error in the operation of the SoC may be detected from a comparison between the outputs of the redundant workloads. In some examples, the redundant workloads may be performed on the same processor core (e.g. with multiple threads executing on the same core each performing the same processing operations and the outcomes of each redundant thread being compared to detect errors). In other examples, the SoC may comprise a plurality of redundant cores configured to perform the plurality of redundant workloads, such as those described in more detail below. Such a system may be referred to as a "lockstep" system (as the redundant cores may perform the redundant workloads with a fixed timing relationship between the respective cores). However, not all types of error may be detected from the comparison of redundant workloads, as a common mode fault could arise on a signal line or input used for all the redundant workloads (e.g. a common clock, reset or power supply line) which could affect all the redundant workloads in the same way so that the comparison of the outputs of the redundant workloads may not detect the error.

Hence, in some examples the anomaly event may be associated with a common mode fault of the plurality of redundant workloads. For example, the operating condition for which the transient anomaly event is detected could be the voltage level or pulse duration of a signal on a signal line of the system on chip which is supplied to all of the redundant cores, such as a power line, clock line, analogue or digital data signal line, reset line or interrupt line. The fault tolerance and error correction capabilities of the SoC are thus improved relative to comparative systems in which the present methods are not implemented. For example, such comparative systems may be able to detect anomaly events that affect a single one of the lockstep processors, by determining differences between outputs of the lockstep processors as described in more detail below, but be unable to detect common mode faults that affect all of the lockstep processors of the SoC. Conversely, an SoC implementing the presently described example method can detect and correct for common mode faults. In systems having multiple redundant cores, the response action taken in the event of a common mode fault being detected may consider the individual susceptibility of components within each redundant core of the lockstep system.

Various anomaly response actions can be performed in example methods of the present disclosure. For example, any one of the following, or any combination thereof, may be performed:

resetting the at least one component that is susceptible to the anomaly event as described above;

signalling an exception, in order to indicate that a potential error has occurred and trigger a further recovery action;

imposing an execution delay on at least one component that is dependent on the at least one component that is susceptible to the anomaly event, in order to provide time for recovery from the anomaly event;

shutting down the system on chip, for example where the anomaly event is irrecoverable and/or damage is likely to have occurred to the SoC;

issuing a diagnostic signal, for example to indicate to a connected system or to a user that the anomaly event has occurred;

activating at least one backup processor, for example to take over operation from one or more processors of the SoC that were susceptible to the anomaly event; and/or recording an indication of at least one of: which component is susceptible to the anomaly event, a type of anomaly event and the magnitude of the anomaly event, in order to facilitate later analysis and diagnosis of the nature, causes and effects of the anomaly event. For example, the indication may be stored in non-volatile storage such as in fuses, electrically erasable programmable read-only memory, or flash memory, in order to preserve a record of the anomaly event across a cold boot or a power cycle.

After resetting a component to a previous state, peripheral or component registers may be restored. This may be performed for example by restoration from a backup, or by re-running a component initialization sequence in code or hardware.

In some examples, the measuring of the anomaly comprises measuring the operating condition with a plurality of anomaly detectors, at least one of which detects the anomaly. The detectors may be located in physically different locations on the SoC. The determining of the anomaly response action may then be based on a fraction of the anomaly detectors that detect the anomaly. For example, if the anomaly is detected by some, but not all, of the detectors, it may indicate a malicious attack. By way of illustration, one possible attack vector is based on use of a micro-loop antenna that creates a super-local magnetic field. A magnetic field sensor in close proximity to the antenna would thus detect a high magnetic flux, whilst other sensors would not detect a high flux. The difference between these signals could indicate an attack, as contrasted for example with a general change in a magnetic field in the vicinity of the SoC, which would typically not vary sharply over the area of the SoC and would thus cause similar readings from all sensors. In some such examples, the determining of the response action comprises selecting, based on the fraction of the anomaly detectors that detect the anomaly, between a fault response action and a malicious attack response action. For example, if a malicious attack is detected, cryptographic keys of the SoC may be deleted so that they are not available to the attacker. Conversely, if it is determined that the fraction of detectors that detect the anomaly is not consistent with a malicious attack, the cryptographic keys may be maintained. Unnecessary deletion of the keys is thereby averted.

Particular examples will now be described with reference to the Figures.

FIG. 1 shows schematically a lockstep processing system 100. One of the uses of lockstep processing systems is in safety-critical applications such as those that control the operation of automated vehicles. The system 100 comprises two processor cores 105a, 105b configured to simultaneously, or semi-simultaneously, perform the same operations. As noted above, this provides redundancy. An error detector 110 detects divergences in the output of the processors 105a, 105b. Such divergences indicate an error in the operation of one of the processors 105a, 105b. Errors are signalled by the error detector 110, following which an error correction action can be performed. For example, the flow of operation of the processors 105a, 105b may be rolled back to a state before the error occurred.

Whilst errors in the operation of one processor 105a, 105b can be detected as described above, some errors affect both processors 105a, 105b in a similar fashion. Such errors are termed "common mode faults" and may for example arise because the processors 105a, 105b share some components such as a clock generator 115, voltage supply 120 and reset signal generator 125. A fault in a signal from one of these shared components, for example a voltage spike from the voltage supply 120 or an error in clock signal timing from the clock generator 115, would equally affect both processors 105a, 105b and thus any consequent error in the operation of one of the processors 105a, 105b would also manifest in the other processor 105a, 105b. Such an error would not cause any differing between the outputs of the processors 105a, 105b and so would not be detectable by comparison between the outputs by the error detector 110.

Figure 2:
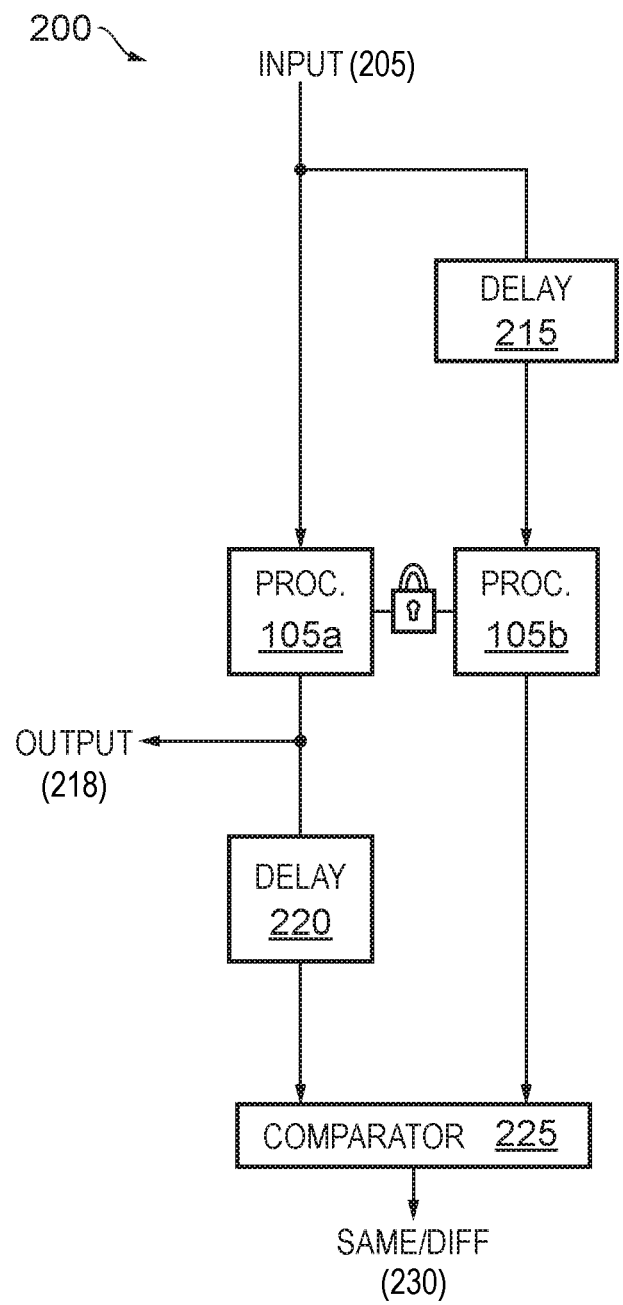
FIGS. 2 and 3 schematically illustrate methods of implementing a lockstep system.

FIG. 2 illustrates schematically one way in which the lockstep system 200 can be implemented. An input 205 is provided to two processors 105a, 105b which may for example operate in the same manner as the processors 105a, 105b of FIG. 1. The input to the processor 105b is delayed by a delay unit 215, for example by two clock cycles. The processor 105a thus runs ahead of the processor 105b.

Processor 105a outputs undelayed output signals 218 to other components of the system. The output of processor 105a is also delayed by delay unit 220, and the delayed output is provided along with the output of processor 105b to a comparator 225. The delay unit 220 applies the same delay as the delay unit 215, and so the outputs of the processors 105a, 105b are synchronised when they arrive at the comparator 225. The comparator 225 identifies any discrepancy between the outputs in a similar manner to the error detector 110 of FIG. 1. The result of this comparison 230 is output following which, in the case of any discrepancy, an action can be taken such as rolling the state of processors 105a, 105b back to a pre-fault state.

As a consequence of the processors 105a running ahead of the processor 105b, some common mode faults such as voltage spikes or clock glitches affect the processors 105a, 105b at different points in their execution flow. This increases the likelihood that the fault will cause a discrepancy between the outputs of the processors 105a which can be detected by the comparator 230. Fault resilience is thereby improved. However, common mode faults can still occur that may not be detected by the comparator (e.g. a common mode fault in a shared signal line such as an interrupt line or reset line could cause incorrect operation but may not be detectable from a difference in the outputs compared by the comparator 225). Furthermore, no information is available as to the cause of any particular fault.

Figure 3:
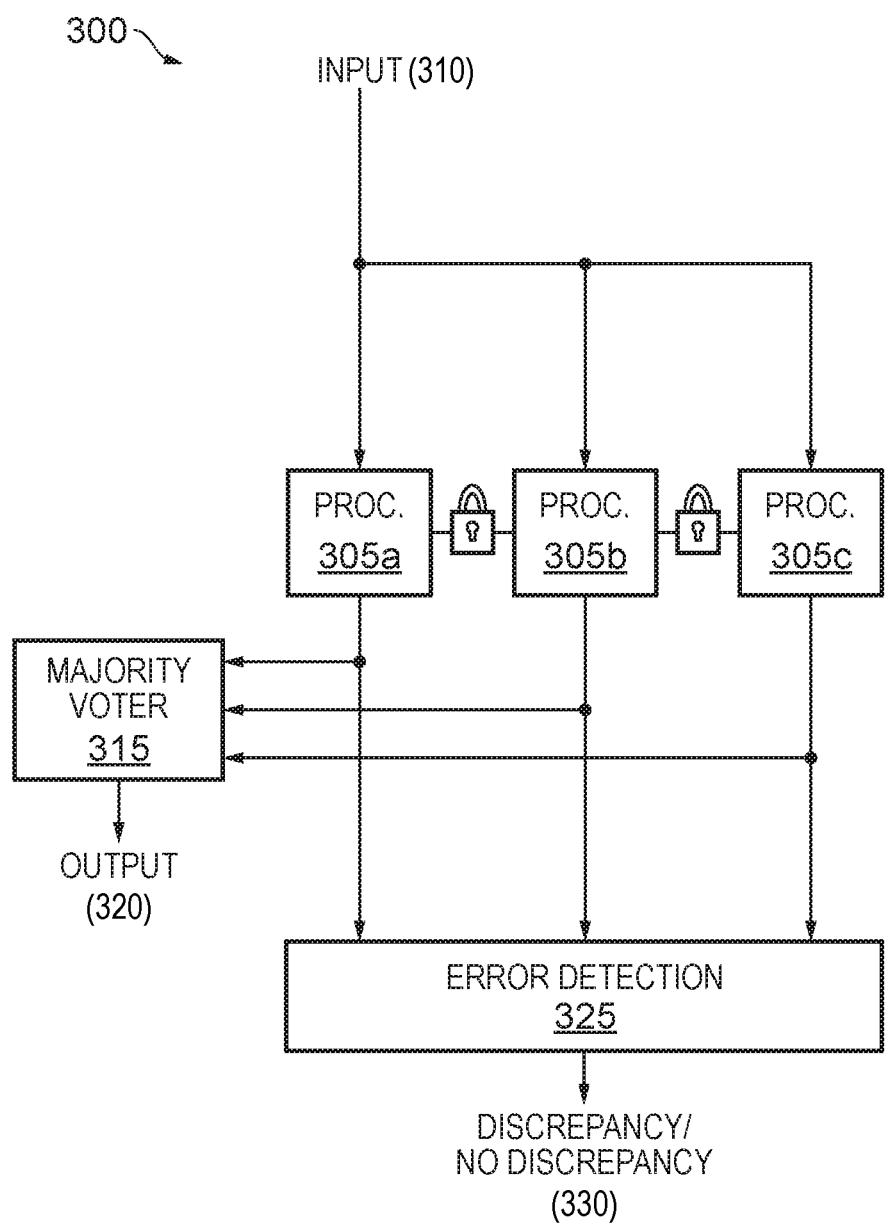

The lockstep processing systems described above rely on a comparison between outputs of the processors to detect errors. Another way of implementing redundant lockstep processing will now be described with reference to FIG. 3.

A lockstep processing system 300 comprises three redundant lockstep processors 305a-305c. Inputs 310 are provided simultaneously to each processor 305a-305c. The outputs of each processor 305a-305c are provided to a majority voting unit 315.

The majority voting unit 315 receives the outputs of each processor 305a-305c and determines a single definitive output 320. If the processors 305a-305c produce the same output, the majority voting unit 315 provides this output as the definitive output 320. If two of the processors 305a-305c provide the same "majority" output but the third provides a differing "minority" output, the majority voting unit 315 provides the majority output as the definitive output 320. The system 300 can thus proceed with its operation flow without interruption regardless of a fault in one of the processors 305a-305c. For this reason, a system such as the system 300 can be termed a "fail-functional" lockstep system.

The system 300 can thus function without a separate comparator such as that of FIG. 2. However, in some implementations the outputs of the processors 305a-305c are provided to an error detection unit 325. The error detection unit 325 compares the outputs of the processors 305a-305c and outputs an indication 330 of whether there was a discrepancy. This can be used for example for logging the incidence of faults. However, common mode faults could still occur in the event of anomalies on a common signal line as discussed above for FIG. 2, or if there is an anomaly which affects the operation of the majority voter circuitry 315 or error detection logic 325 in FIG. 3.

Examples of the present disclosure provide an improved method for detecting and responding to anomalies such as common mode faults. For example, such methods can be implemented within a system such as the system 300 or the system 200 of FIG. 2, or in other systems which do not use lockstep or redundant processing at all. In general, as explained above, methods of the present disclosure can provide improved accuracy of identifying anomalies and diagnosing their causes, as well as providing improved effectiveness of anomaly response and reducing the impact thereof on system performance.

Figure 4A:
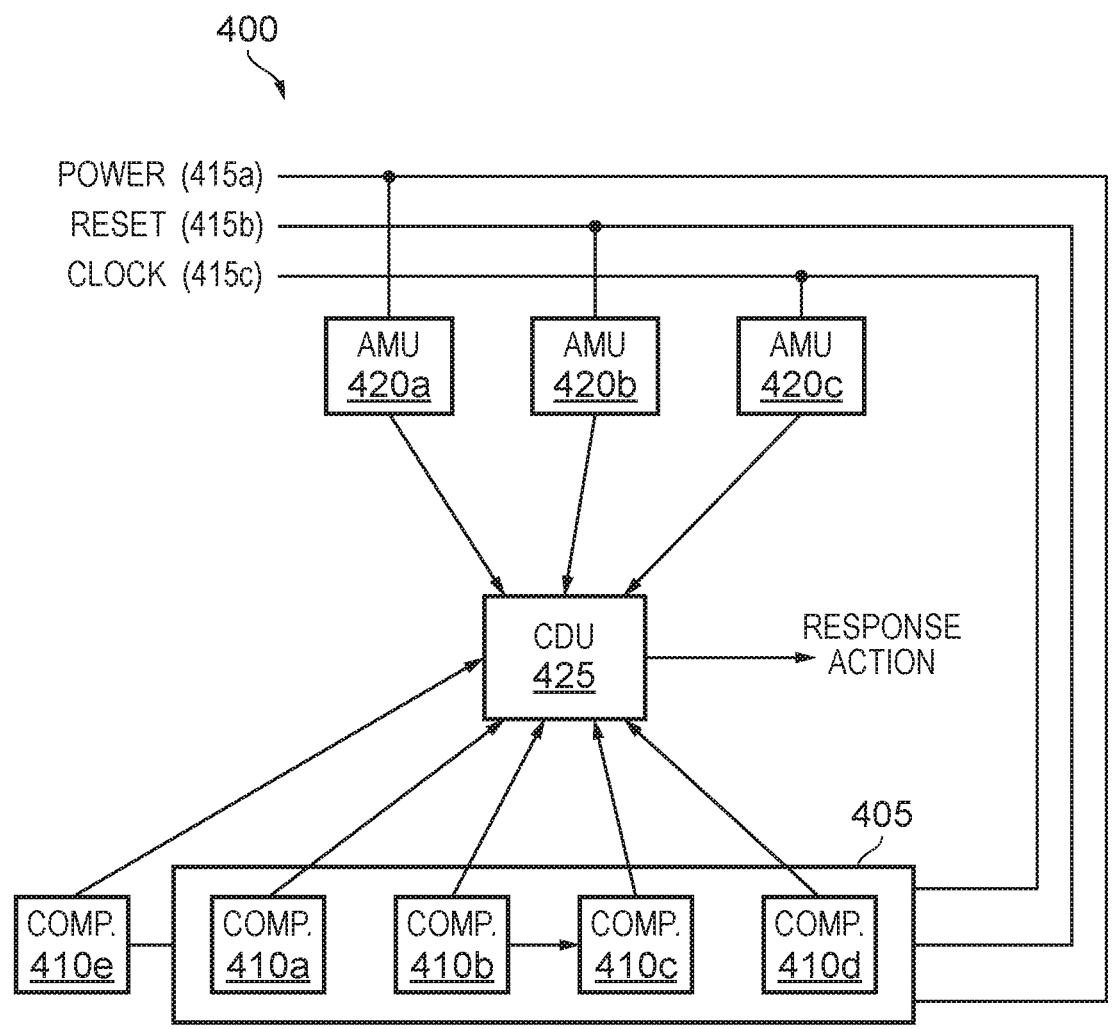
FIGS. 4A to 4C show schematically systems according to examples of the present disclosure.

FIG. 4A shows schematically a system 400 according to examples of the present disclosure. The system 400 is implemented in a system on chip.

The system 400 comprises a processor 405. The processor 405 comprises a plurality of components 410a-410d. The components may for example implement stages of a processing pipeline of the processor, such as fetch, decode, execute, memory access and write back stages. The components may include processing units such as an arithmetic logic unit and/or a floating point unit. The system 400 can further comprise one or more components 410e external to the processor 405. For example, such external components may include on-chip memory, a memory controller, a graphics processing unit, an encryption/decryption engine, a display controller, an interconnect, an interrupt controller, peripheral input/output ports, and/or a network controller.

The system 400 comprises signal lines including a power line 415a, a reset line 415b and a clock line 415c. Other signal lines (not shown) may include for example an interrupt line and an analogue or digital data signal line. The signal lines 415a-415c provide their respective signals to the processor 405.

The signal on each signal line 415a-415c is monitored by a respective anomaly measuring unit (AMU) 420a-420c. Each anomaly measuring unit 420a-420c may be implemented within dedicated circuitry. Alternatively, the anomaly measuring units 420a-420c may be implemented as logical elements of a single dedicated circuitry unit.

Each anomaly measuring unit 420a-420c is configured to detect particular anomalies in its respective signal line 415a-415c. For example, as described elsewhere herein the anomalies may include deviations from expected voltage levels or timings of voltage pulses.

The system 400 comprises a central diagnosis unit (CDU) 425, which may for example function in the same manner as the susceptibility indication unit described elsewhere herein.

When a given anomaly measuring unit 420a-420c detects an anomaly in the signal of its associated signal line 415a-415c, it transmits an alert signal to the central diagnosis unit 425. The central diagnosis unit 425 is further configured to receive component usage information from each component 410a-410e.

The central diagnosis unit 425 interprets received alerts in conjunction with the received component usage information and, based on this, determines whether one or more response actions are required. Response actions can be global, for example resetting or shutting down the entire processor 405, or local, for example resetting a particular component 410a-410e. As an example it may be determined that a given component 410a-e, that would ordinarily be susceptible to a detected anomaly, is not in fact susceptible because the component usage information indicates that it was not in use at the time of the anomaly. The response to a given anomaly can thus be tuned on a granular component-by-component basis, reducing the incidence of unnecessary resets or shutdowns of the processor 405. The response can also take into account the individual sensitivity of each component 410a-410e to particular types of anomaly. For example, some components 410a-410e might be more resilient to timing anomalies, because their combinational paths have more slack, or to voltage anomalies. As another example, in which the processor 405 implements a commit queue, instructions that are not committed can be re-executed when they could have been affected by a detected anomaly. Some anomalies can also be detected, and appropriately responded to, before they become harmful to the processor 405.

In the system 400, component 410b provides an output to component 410c. This is shown by an arrow in FIG. 4A. Component 410c is thus dependent on component 410b. As explained above, an anomaly could occur to which component 410b is susceptible but component 410c is not. However, if such an anomaly affected the output of component 410b, the component 410c would receive an incorrect input and thereby be indirectly susceptible to the anomaly event. In some examples, the central diagnosis unit 425 tracks such dependencies and takes them into account when determining the response action. For example, components 410b and 410c may both be reset, even where component 410c is not directly susceptible to a given anomaly event.

In some examples the system 400 comprises further processors operating in a redundant lockstep fashion as described in more detail above. In such examples, each redundant processor may have components with susceptibility monitored by the central diagnosis unit 425.

Figure 4B:
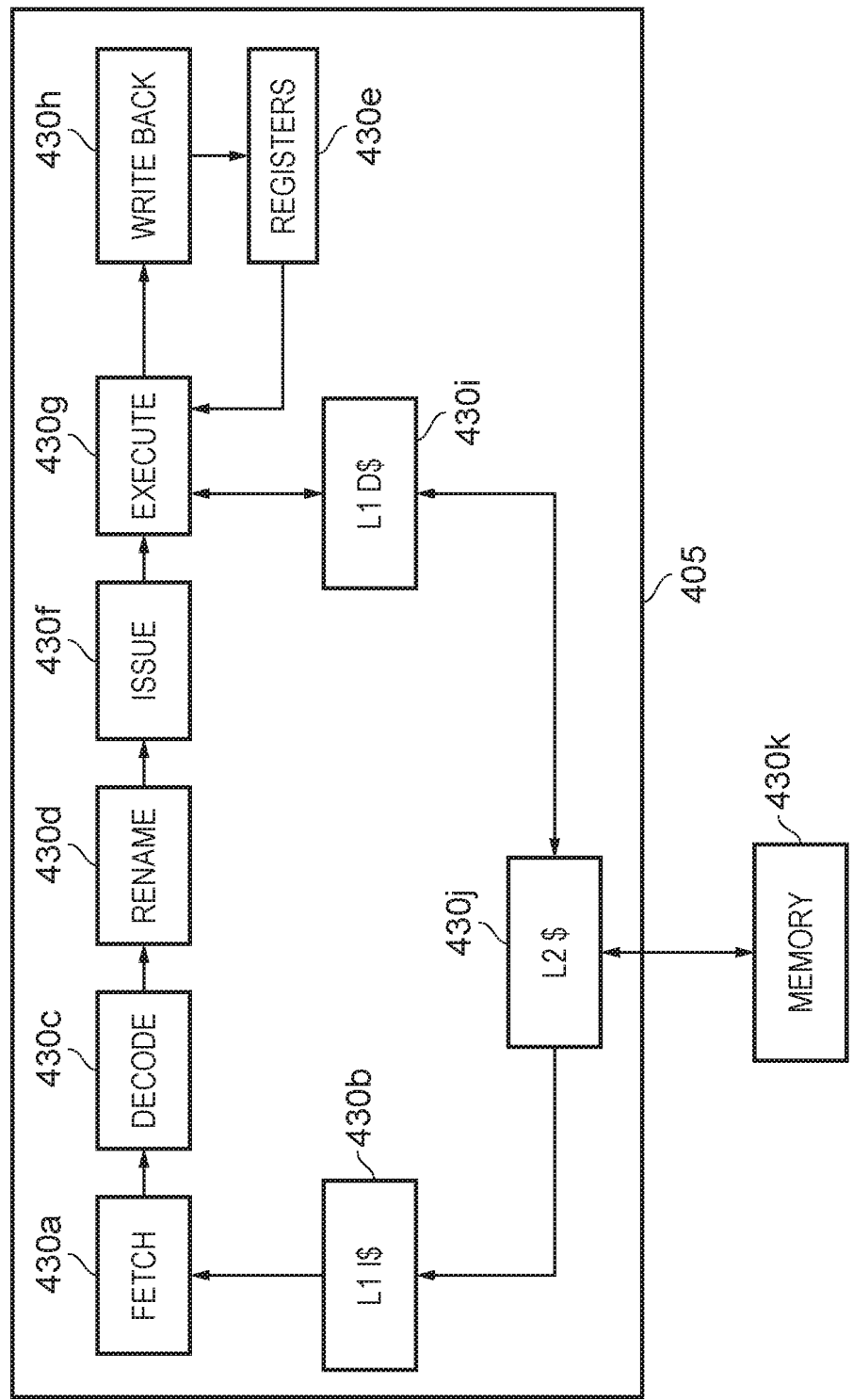

The processor 405 was shown in FIG. 4A as comprising generic components 410a-410d, and being connected to generic extended component 410e. FIG. 4B shows, in more detail, one particular example of the aforementioned components. For clarity, new reference numerals are used. However, it is to be understood that the components 430a-430k of FIG. 4B can be implemented within the wider system 400 of FIG. 4A.

As shown in FIG. 4B, the processor 405 has a processing pipeline comprising a number of pipeline stages. A fetch stage 430a fetches the instructions, identified by fetch addresses, from an instruction cache 430b. A decode stage 430c decodes the fetched instructions to generate control information for controlling the subsequent stages of the pipeline. A rename stage 430d performs register renaming to map architectural register specifiers identified by the instructions to physical register specifiers identifying registers 430e provided in hardware. An issue stage 430f queues instructions awaiting execution until the required operands for processing those instructions are available in the registers 430e. An execute stage 430g executes the instructions to carry out corresponding processing operations. A writeback stage 430h writes results of the executed instructions back to the registers 430e.

The execute stage 430g is configured to perform load operations to load data from a memory system to the registers 430e and store operations to store data from the registers 430e to the memory system. In this example the memory system includes a level one instruction cache 430b, a level one data cache 430i, a level two cache 430j which is shared between data and instructions, and main memory 430k, but it will be appreciated that this is just one example of a possible memory hierarchy and other implementations can have further levels of cache or a different arrangement. The main memory component 430k is external to the processor 405, in the same manner as the generic external component 410e of FIG. 4A.

Any combination of components 430a-430k can be connected to the central diagnosis unit 425 as described above with reference to FIG. 4A. In some examples, a subset of components 430a-430k may share the same or similar susceptibility to anomaly events. In some such examples, one component of the subset is connected to the central diagnosis unit 425 and it is assumed that any susceptibility, or lack thereof, that is determined for that component applies equally to the other components of the subset.

Figure 4C:
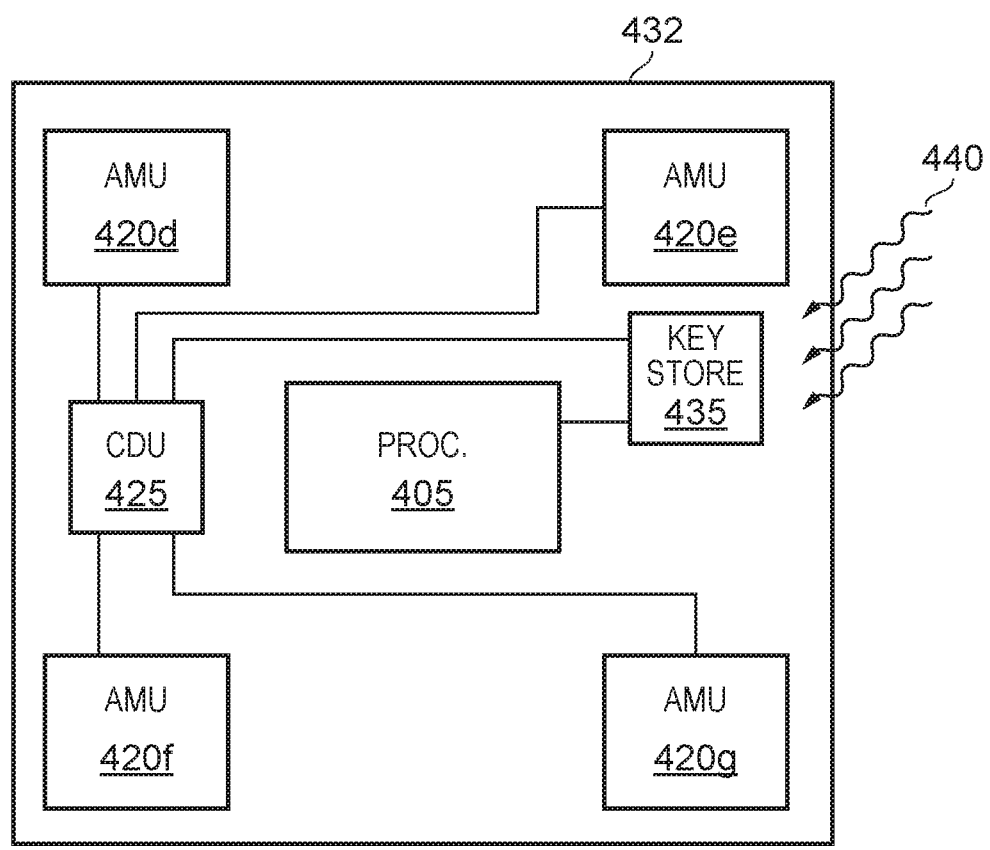

FIG. 4C shows one particular geometric layout of some components of a system 432 that has features in common with, and functions similarly to, the system 400. The system 432 comprises a processor 405 as described in more detail above. The system comprises a key store 435 external to the processor, configured to store cryptographic keys for use by the processor. The components of the processor 405, and the key store 435, are connected to a central diagnosis unit 425 as described in more detail above.

The system 432 comprises anomaly measuring units 420d-420g. The anomaly measuring units 432d-432g are configured to determine anomalies in radiation flux, for example ionising and/or electromagnetic radiation flux, and to provide indications of detected anomalies therein to the central diagnosis unit 425 as described in more detail above.

If the central diagnosis unit 425 determines that all anomaly measuring units 420a-420g have detected a similar change in radiation flux, it can be assumed that the background radiation level in the vicinity of the system 432 has changed. If this is sufficiently high as to cause faults in one or more components of the processor 405 and key store 435, a fault response action may be taken as described in more detail above. However, if the central diagnosis unit determines that one anomaly measuring unit 420e adjacent to the key store 435 has detected a high flux whilst the other anomaly measuring units 420d, 420f, 420g have not, it may be an indication that radiation 440 is being applied to the key store as part of a malicious attack. In response to this, a malicious attack action may be taken as well as, or instead of, the fault response action. For example, any keys stored in the key store may be deleted.

The varying sensitivities of processor components to anomaly events, in particular signal glitches of different voltages and time durations, will now be illustrated with reference to FIG. 5.

Figure 5:
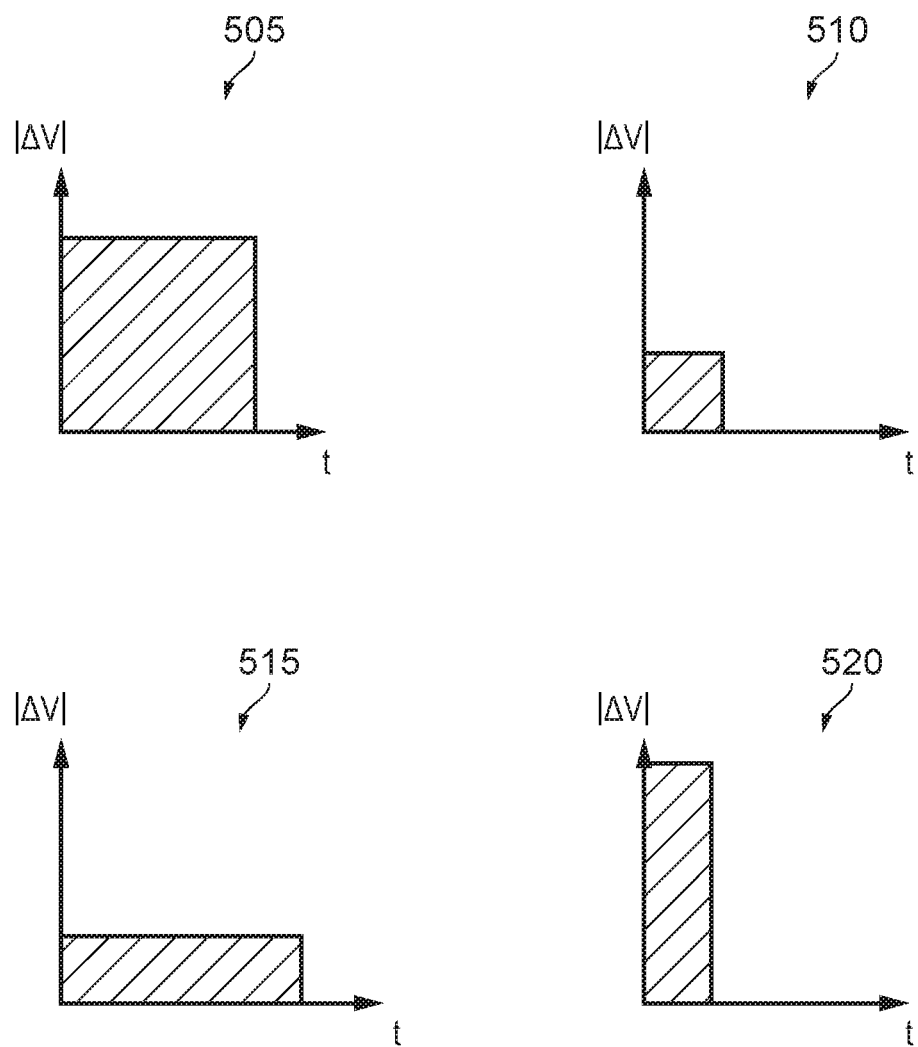
FIG. 5 shows graphs illustrating the sensitivity of different system components to anomaly events.

FIG. 5 shows graphs 505, 510, 515, 520. Each graph 505-520 illustrates the sensitivity of a different component to signal glitches, each of which has a voltage change of magnitude $|\Delta V|$ that occurs for a duration t (the voltage change could be a drop of the voltage compared to the nominal operating voltage, or an increase in the voltage compared to the nominal operating voltage). Each component is not susceptible to glitches with a voltage change below a certain magnitude, and also not sensitive to glitches with a duration below a certain value. This is represented by way of a shaded "safe operating region" on each graph", such that the component is not sensitive to glitches with a voltage change and duration that lie within the safe operating region.

Graph 505 corresponds to a relatively resilient component that is only sensitive to glitches with relatively large voltage change and/or duration.

Graph 510 corresponds to a relatively sensitive component that is only resilient to glitches with relatively small voltage change and duration.

Graph 515 corresponds to a component that is relatively resilient to glitch duration, but sensitive to voltage changes.

Graph 520 corresponds to a component that is relatively sensitive to glitch duration, but resilient to voltage changes.

In some examples, the above-described safe operating ranges are determined by computer simulation of the response of each type of component to glitches of varying voltage magnitude and duration. Alternatively or additionally, the safe operating ranges may be determined by testing of components. For example, the safe operating ranges may be approximated by computer simulation and then refined by testing. Safe operating ranges can be encoded on a SoC in various manners. By way of example, the ranges can be stored as values in programmable registers or memory of the SoC. As another example, the ranges can be encoded in hardwired, or fused, connections on the SoC.

Figure 6:
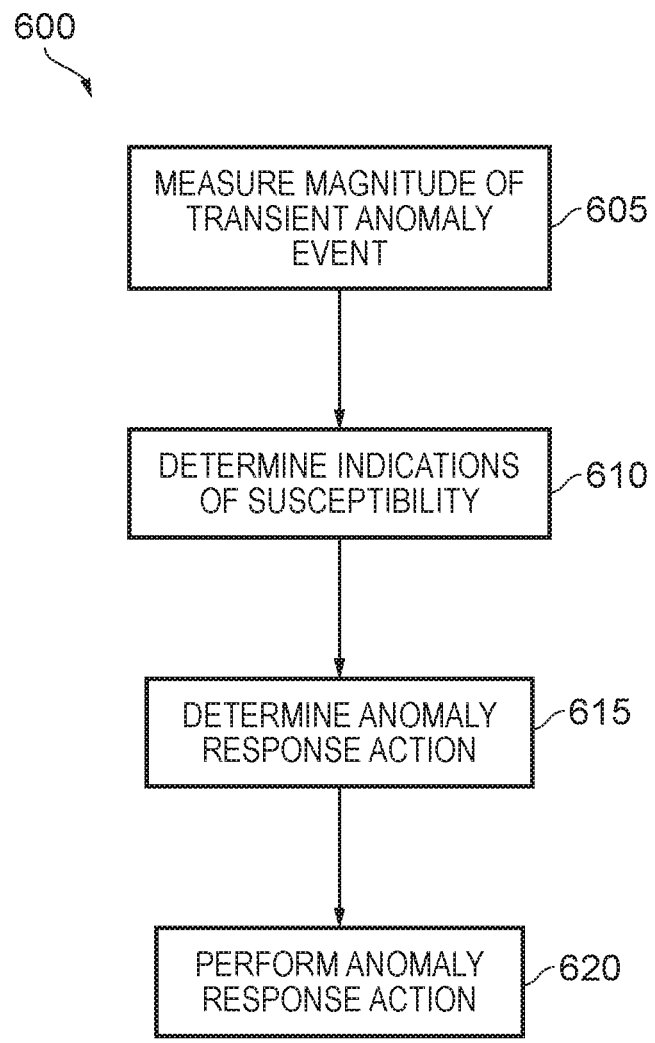
FIG. 6 schematically shows a method for anomaly response in a system on chip, according to examples of the present disclosure.

FIG. 6 schematically shows a method 600 for anomaly response in a SoC, according to examples of the present disclosure.

The method 600 comprises a step 605 of measuring a magnitude of a transient anomaly event in an operating condition of the SoC.

The method 600 comprises a step 610 of, based on the magnitude, determining, for each of a plurality of components of the SoC, an indication of susceptibility of that component to an anomaly event of the measured magnitude.

The method 600 comprises a step 615 of, based on the determined indications of susceptibility for each of the plurality of components, determining an anomaly response action.

The method 600 comprises a step 620 of performing the anomaly response action.

Figure 7:
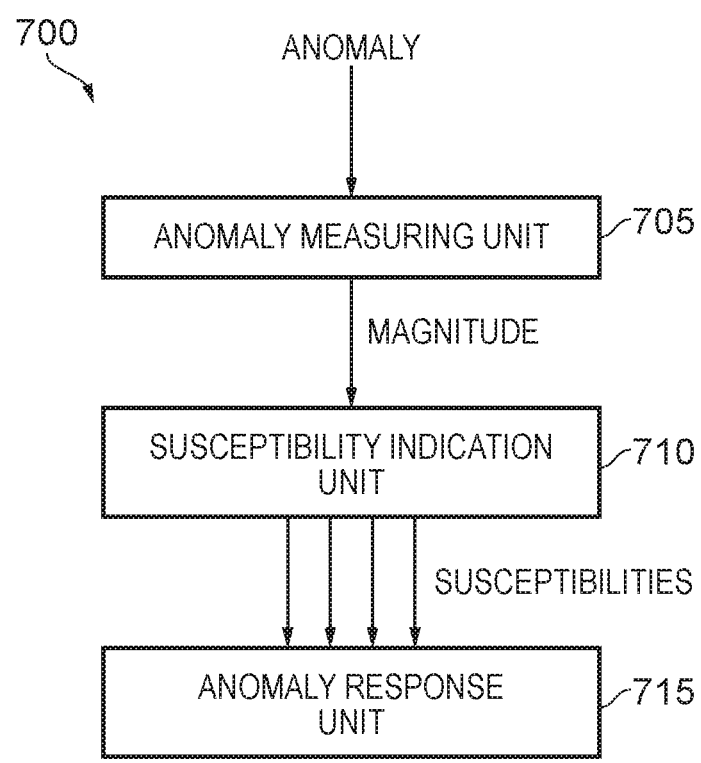
FIG. 7 schematically shows an apparatus according to examples of the present disclosure.

FIG. 7 shows schematically an apparatus 700 according to examples of the present disclosure. The apparatus 700 is for measuring and responding to anomaly events in operating conditions of a SoC. The components may for example be implemented as components of the SoC. The components may be implemented in dedicated circuitry or as operating routines of general-purpose circuitry.

The apparatus 700 comprises an anomaly measuring unit 705 to measure a magnitude of a transient anomaly event in an operating condition of a SoC.

The apparatus 700 comprises a susceptibility indication unit 715 to, based on the magnitude, determine, for each of a plurality of components of the SoC, an indication of susceptibility of that component to an anomaly event of the measured magnitude.

The apparatus 700 comprises an anomaly response unit 715 to, based on the determined indications for each of the plurality of components, determining an anomaly response action and perform the anomaly response action.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method for anomaly response in a system on chip, the method comprising:
    measuring a magnitude of a transient anomaly event in an operating condition of the system on chip;
    based on the magnitude, determining, for each of a plurality of components of the system on chip, an indication of susceptibility of that component to an anomaly event of the measured magnitude;
    based on the determined indications of susceptibility for each of the plurality of components, determining an anomaly response action; and
    performing the anomaly response action,
    wherein the determining of the indication of susceptibility for a given component of the plurality is based on comparing the measured magnitude with a range of the operating condition for the given component,
    the method further comprising varying the range based on an operating state of the system on chip.

2. A method according to claim 1, wherein determining the anomaly response action comprises selecting the anomaly response action from a plurality of possible anomaly response actions, at least one of which permits continued forward progress of the system on chip.

3. A method according to claim 1, wherein:
    the method comprises determining a dependent component of the plurality of components, the dependent component being dependent on a given other component of the plurality of components; and
    the determining of the susceptibility of the dependent component to the anomaly event is additionally based on the susceptibility of the given other component to the anomaly event.

4. A method according to claim 1, wherein the anomaly event is a variation of the operating condition outside expected operating conditions of the system on chip.

5. A method according to claim 1, wherein the operating condition comprises a voltage level or pulse duration of a signal on a signal line of the system on chip.

6. A method according to claim 5, wherein the signal line is one of:
    a power line;
    a clock line;
    an analogue or digital signal line;
    a reset line; or
    an interrupt line.

7. A method according to claim 1, wherein the operating condition is an environmental condition of the at least one system on chip.

8. A method according to claim 7, wherein the environmental condition is one of:
a temperature;
an ionizing radiation flux;
a shock impulse;
an acceleration;
a vibration intensity; or
an electromagnetic radiation flux.

9. A method according to claim 1 comprising determining, for each component of the plurality, component usage information for a time of occurrence of the anomaly event, wherein:
the determining of the indication for a given component of the plurality is based on the component usage information for the given component.

10. A method according to claim 9 wherein, when the component usage information for the given component of the plurality indicates an inactivity of the given component at the time of occurrence of the anomaly event, the indication for the given component indicates a lack of susceptibility to the anomaly event.

11. A method according to claim 9 wherein, when the component usage information for the given component of the plurality indicates an inactivity of the given component at the time of occurrence of the anomaly event, and the indication for the given component indicates a susceptibility to the anomaly event, the anomaly response action comprises resetting the given component and permitting continued forward operation of the system on chip.

12. A method according to claim 1, wherein:
the system on chip is configured to perform a plurality of redundant workloads; and
the anomaly event is associated with a common mode fault of the plurality of redundant workloads.

13. A method according to claim 12, wherein:
the system on chip comprises a plurality of redundant cores configured to perform the plurality of redundant workloads.

14. A method according to claim 1, wherein when the indications indicate that at least one component of the plurality is susceptible to the anomaly event, the anomaly response action comprises at least one of:
resetting the at least one component that is susceptible to the anomaly event;
signalling an exception;
imposing an execution delay on a component that is dependent on the at least one component that is susceptible to the anomaly event;
shutting down the system on chip;
issuing a diagnostic signal;
activating at least one backup processor; and
recording an indication of at least one of: which component is susceptible to the anomaly event, a type of anomaly event and the magnitude of the anomaly event.

15. A method according to claim 1, wherein:
the measuring of the anomaly comprises measuring the operating condition with a plurality of anomaly detectors, at least one of which detects the anomaly; and
the determining of the anomaly response action is based on a fraction of the anomaly detectors that detect the anomaly.

16. A method according to claim 15, wherein the determining of the response action comprises selecting, based on the fraction of the anomaly detectors that detect the anomaly, between a fault response action and a malicious attack response action.

17. A method according to claim 1, wherein at least two components of the plurality of components comprise different sub-portions of the same processor core of the system on chip.

18. An apparatus comprising:
anomaly measuring circuitry to measure a magnitude of a transient anomaly event in an operating condition of a system on chip;
susceptibility indication circuitry to, based on the magnitude, determine, for each of a plurality of components of the system on chip, an indication of susceptibility of that component to an anomaly event of the measured magnitude; and
anomaly response circuitry to:
based on the determined indications for each of the plurality of components, determining an anomaly response action; and
perform the anomaly response action,
wherein the determination of the indication of susceptibility for a given component of the plurality is based on a comparison of the measured magnitude with a range of the operating condition for the given component, and
wherein the range is variable based on an operating state of the system on chip.

* * * * *